United States Patent [19]

Ishizuka et al.

[11] Patent Number: 5,276,914
[45] Date of Patent: Jan. 4, 1994

[54] DUAL-MODE TRANSCEIVER THAT SWITCHES OUT A LARGE INSERTION LOSS FILTER DURING TRANSMISSION

[75] Inventors: Seijiro Ishizuka; Kazuto Kitakubo, both of Tokyo, Japan

[73] Assignee: Sony Corporation, Tokyo, Japan

[21] Appl. No.: 774,837

[22] Filed: Oct. 11, 1991

[30] Foreign Application Priority Data

Oct. 18, 1990 [JP] Japan .................................. 2-279695
Oct. 19, 1990 [JP] Japan .................................. 2-280785

[51] Int. Cl.$^5$ ........................................... H04B 1/44
[52] U.S. Cl. ........................................... 455/83; 375/5; 455/129; 455/280
[58] Field of Search ............... 455/78, 79, 80, 82, 455/83, 129, 280, 281, 289; 375/5; 370/24, 29, 32

[56] References Cited

U.S. PATENT DOCUMENTS

| | | | |
|---|---|---|---|
| 4,677,688 | 6/1987 | Yoshihara et al. | 455/82 |
| 4,903,257 | 2/1990 | Takeda et al. | 455/83 |
| 4,980,660 | 12/1990 | Nahamura et al. | 455/83 |

FOREIGN PATENT DOCUMENTS

355973  7/1989  European Pat. Off. ........ H04B 1/48

OTHER PUBLICATIONS

IEEE Transactions On Vehicular Teachnology, vol. 38, No. 1, Feb. 1989, New York, U.S., pp. 2-8, "Miniaturized SAW Devices For Radio Communication Transceivers" (Hikita et al.).

*Primary Examiner*—Reinhard J. Eisenzopf
*Assistant Examiner*—Chi Pham
*Attorney, Agent, or Firm*—Lewis H. Eslinger; Jay H. Maioli

[57] ABSTRACT

A antenna switching apparatus for a dual-mode transceiver which includes a transmission and reception antenna, a transmitting circuit, a receiving circuit, and a separating filter of large insertion loss is connected to the transmission and reception antenna, the transmitting circuit, and the receiving circuit for separating a transmission high frequency signal and a reception high frequency signal having different carrier frequencies, in which transmission and reception in the digital mode of the transmission and reception switching system and the transmission and reception in the analog mode of the simultaneous transmission and reception system is possible further includes an analog-to-digital change-over switch which changes-over mutual connections among the transmission and reception antenna, the transmitting circuit, the receiving circuit and the separating filter in response to the analog or digital mode, a blocking filter of low insertion loss for blocking a high frequency band of spurious signals caused by the switching of a transmission and reception change-over switch which changes-over the transmission and reception in the digital mode and a bandpass filter of low insertion loss for passing therethrough the reception high frequency signal in the digital mode, so that power consumption in the digital mode is reduced considerably.

10 Claims, 4 Drawing Sheets

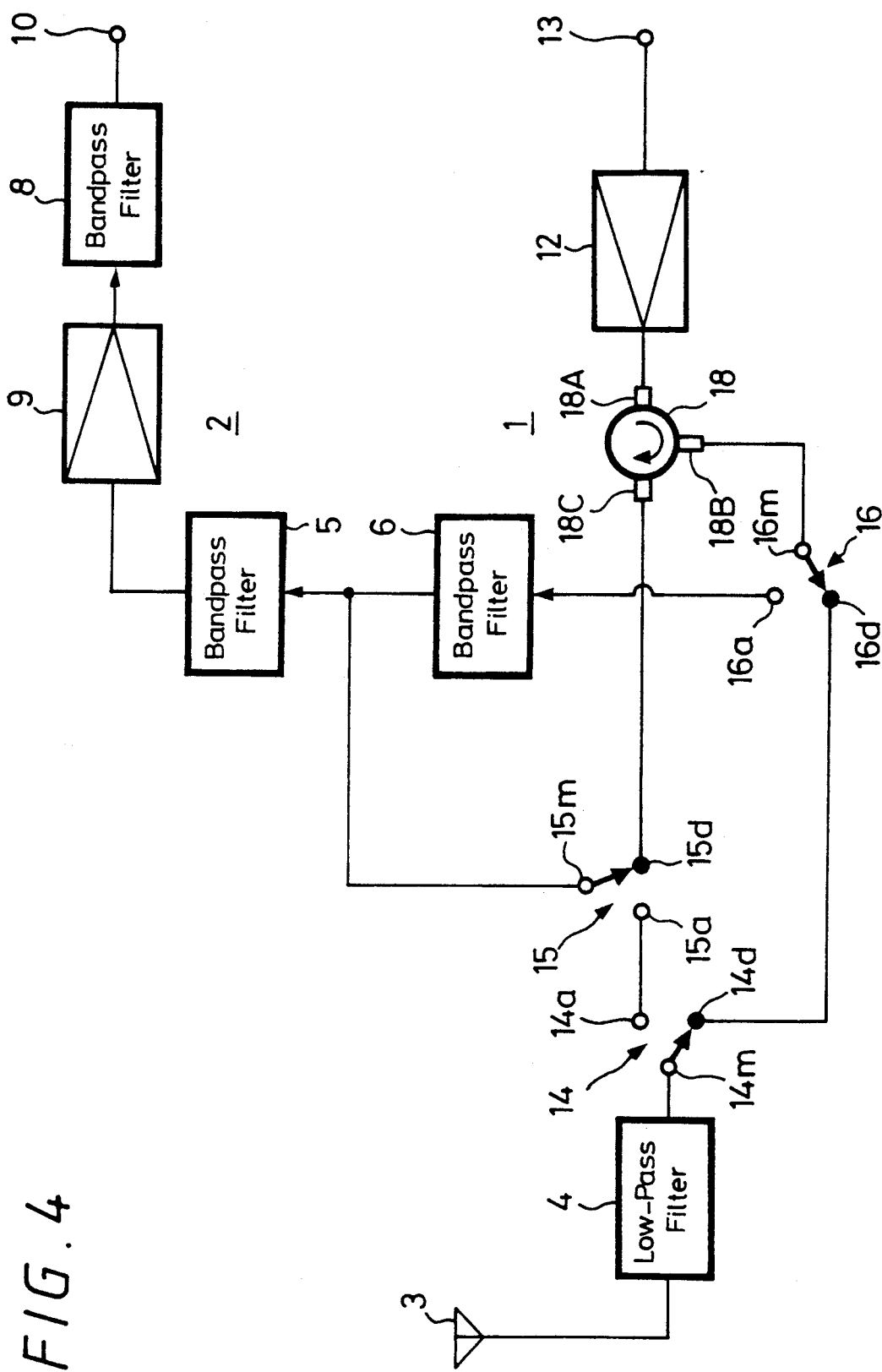

DUAL-MODE TRANSCEIVER THAT SWITCHES OUT A LARGE INSERTION LOSS FILTER DURING TRANSMISSION

BACKGROUND OF THE INVENTION

1. Field of the Invention

The present invention relates to an antenna switching apparatus for a dual-mode transceiver for use in a mobile telephone of a mobile telephone system.

2. Description of the Prior Art

A dual mode (digital mode and analog mode) mobile telephone system is available in the U.S.A., and a time division multiple access (TDMA) system is employed in the mobile telephone system.

The TDMA system will be described below.

Initially, a plurality of channels in which one frame each of is 40 milliseconds are set and each frame thereof is composed of 6 slots (slots 1 to 6). Each slot has a length of 162 symbols (=324 bits). In the first service, 2 slots (slots 1, 4; slots 2, 5; and slots 3, 6) disposed with an equal interval at every frame are employed as one channel of the full rate traffic channel and 3 channels are multiplexed on the existing high frequency one channel. In the future, for the half rate traffic channel, any one slot within each frame is employed as one channel of the traffic channel and 6 channels are multiplexed on the one high frequency channel.

In the mobile telephone, the transmission and reception frame timing is determined on the basis of the interval of one time slot+44 symbols and the transmission has a priority over the reception. This reference position is referred to as a standard offset reference. The transmission timing of the mobile telephone is controlled by the base station such that it may become earlier than the reference position by the time alignment and is adjusted so as not to conflict with other slots upon reception in the base station.

Accordingly, in the slots 1 to 6 of one frame, for example, a mobile telephone A carries out between it and the base station transmission (slot 1), reception (slot 2), idle (slot 3), transmission (slot 4), reception (slot 5), idle (slot 6), and a mobile telephone B carries out similar transmission, reception and idle of slots 1 to 6 with a delay of time of one slot from the mobile telephone A. Further, a mobile telephone C carries out transmission, reception and idle of similar slots 1 to 6 with a delay of time of one slot from the mobile telephone B. These processes are subsequently sequentially repeated.

A slot format of the mobile telephone relative to the base station is composed of guard time, lump time, data, sync, associated control channel, coded digital verification color code and data, in that order. On the other hand, a slot format of the base station relative to the mobile telephone is composed of sync. slow, associated control channel, data, coded digital verification color code, data and auxiliary area. Incidentally, the data is employed as the user information area.

From the foregoing description, it is to be understood that the telephone system of the digital mode is based on the transmission and reception switching system, while the analog mode telephone system is based on the simultaneous transmission and reception system.

As the carrier frequency, the frequency band of 824 to 849 MHz is allocated to the transmission (for reception at the base station) in the mobile telephone and the frequency band of 869 to 894 MHz is allocated to the reception (transmission from the base station) at the mobile telephone, respectively. Each of these bands is divided at the interval of 30 kHz and one high frequency channel is allocated to each of the divided bands.

An example of a conventional transmitter and receiver circuit for a mobile telephone in the dual-mode mobile telephone system available in the U.S.A. will be described with reference to FIG. 1.

Referring to FIG. 1, it will be seen that a transmitting circuit 1 and a receiving circuit 2 are connected to a transmitting and receiving antenna 3 via a duplexer 20. The duplexer 20 might be a dielectric filter which is composed of a reception side bandpass filter of high Q which passes therethrough a received high frequency signal, the carrier frequency of which is, for example, 880 MHz and a transmission side bandpass filter of high Q which passes therethrough a transmitted high frequency signal, the carrier frequency of which is, for example, 835 MHz. An insertion loss of the duplexer 20 is about 2.0 dB on the transmitting side and about 2.7 dB on the receiving side.

A circuit configuration of the transmitting circuit 1 will be described. As shown in FIG. 1, a modulated audio signal applied to an input terminal 28 is supplied to and frequency-converted by a mixer circuit 26 in a frequency converter 25. The frequency converter 25 is comprised of the mixer circuit 26 and a local oscillator 27. Then, the thus frequency-converted modulated audio signal from the mixer circuit 26 is supplied through a bandpass filter 20 to a high frequency power amplifier 12 and is thereby amplified. The transmission high frequency signal from the power amplifier 12 is supplied through a circulator 11 and the duplexer 20 to the transmitting and receiving antenna 3, from which the transmission high frequency signal is transmitted.

A circuit configuration of the receiving circuit 2 will be described next. As shown in FIG. 1, a received high frequency signal from the duplexer 20 is amplified by a high frequency amplifier 9 and then supplied through a bandpass filter 8 to a mixer circuit 22 of a frequency converter 21, in which it is frequency-converted. The frequency converter 21 is comprised of the mixer circuit 22 and the local oscillator 27 which is commonly used by the transmitting circuit 1 and the receiving circuit 2. The frequency-converted modulated audio signal from the mixer circuit 22 is fed to an output terminal 24.

In the example of the conventional transmitting and receiving circuit, since the transmitted high frequency signal and the received high frequency signal are passed through the duplexer having large insertion loss in the digital mode, an amplification factor of the high frequency amplifier for amplifying the transmission high frequency signal must be increased and an amplification factor of the high frequency amplifier for amplifying the received high frequency signal must be increased, which unavoidably causes power necessary for transmission and reception to be increased by the amount of the insertion loss of the duplexer.

OBJECTS AND SUMMARY OF THE INVENTION

Accordingly, it is an object of the present invention to provide an improved antenna switching apparatus for a dual-mode transceiver in which the aforementioned shortcomings of the prior art can be eliminated.

More specifically, it is an object of the present invention to provide an antenna switching apparatus for a dual-mode transceiver in which power consumption in the digital mode can be reduced.

Another object of the present invention is to provide an antenna switching apparatus for a dual-mode transceiver in which the arrangement can be simplified.

Still another object of the present invention is to provide an antenna switching apparatus for a dual-mode transceiver in which a transmission and reception switching control signal supplied to a transmission and reception change-over switch need not be generated.

As a first aspect of the present invention, an antenna switching apparatus for a dual-mode transceiver having a transmission and reception antenna, a transmitting circuit, a receiving circuit and a separating filter of large insertion loss provided among the transmission and reception antenna, the transmitting circuit and the receiving circuit and which separates a transmission high frequency signal and a reception high frequency signal having different carrier frequencies, in which transmission and reception in the digital mode of the transmission and reception switching system and the transmission and reception in the analog mode of the simultaneous transmission and reception system can be made possible is comprised of a first analog-to-digital change-over switch whose movable contact is connected to the transmission and reception antenna, a second analog-to-digital change-over switch whose analog side fixed contact and movable contact are connected between the separating filter and the receiving circuit, a third analog-to-digital change-over filter whose movable contact and analog side fixed contact are connected to the transmitting circuit and the separating filter, a transmission and reception change-over switch whose transmission side fixed contact and reception side fixed contact are respectively connected to the transmitting circuit and the receiving circuit and which changes-over the transmission and the reception in the digital mode, a blocking filter of low insertion loss connected between the first analog-to-digital change-over switch and the transmission and reception change-over switch and blocking a high band of a spurious caused by the switching of the transmission and reception change-over switch, and a bandpass filter of low insertion loss connected between the transmission and reception change-over switch and the second analog-to-digital change-over switch and passing therethrough the reception high frequency signal.

In accordance with a second aspect of the present invention, an antenna switching apparatus for a dual-mode transceiver having a transmission and reception antenna, a transmitting circuit, a receiving circuit and a separating filter of large insertion loss provided among the transmission and reception antenna, the transmitting circuit and the receiving circuit and which separates a transmission high frequency signal and a reception high frequency signal having different carrier frequencies, in which transmission and reception in the digital mode of the transmission and reception switching system and the transmission and reception in the analog mode of the simultaneous transmission and reception system can be made possible is comprised of a first analog-to-digital change-over switch whose movable contact is connected to the transmission and reception antenna via a bandpass filter of low insertion loss which passes therethrough the transmission high frequency signal and the reception high frequency signal, a second analog-to-digital change-over switch whose movable contact is connected to the separating filter and whose analog mode fixed contact is connected to the analog mode fixed contact of the first-to-digital change-over switch, a 3-terminal isolator of low insertion loss having first, second and third terminals in which the first terminal is connected with the transmitting circuit and the third terminal is connected to the digital mode fixed contact of the second analog-to-digital change-over switch, and a third analog-to-digital change-over switch whose movable contact is connected to the second terminal of the 3-terminal isolator, whose analog mode fixed contact is connected to the separating filter and whose digital mode fixed contact is connected to the digital mode fixed contact of the first analog-to-digital change-over switch.

According to the above-described present invention, since the transmission high frequency signal and the reception high frequency signal are not processed by the separating filter of large insertion loss in the digital mode and since the transmission high frequency signal and the reception high frequency signal are respectively processed by the blocking filter of small insertion loss and also the reception high frequency signal is processed by the bandpass filter of small insertion loss, the attenuation of the reception high frequency signal received at the transmission and reception antenna is small so that the amplification factor of the high frequency amplifier can be reduced. As a consequence, the transmission high frequency signal need not be amplified so much by the high frequency amplifier and hence the amplification factor of the high frequency amplifier may be small. Therefore, the power consumption in the digital mode can be reduced both in transmission and reception, thus considerably reducing power consumption of the entire circuit in the digital mode as compared with that of the prior art.

Further, according to the present invention, since the transmission high frequency signal is not processed by the separating filters of large insertion loss in the digital mode but processed by the bandpass filter of small insertion loss and the 3-terminal isolator of small insertion loss, the transmission high frequency signal need not be amplified so much by the high frequency amplifier so that the amplification factor of the high frequency amplifier may be small, thus reducing the power consumption. Furthermore, since the reception high frequency signal is processed not only by the bandpass filter of small insertion loss and the 3-terminal isolator of small insertion loss but by the separating filter of large insertion loss, the amplification factor of the high frequency amplifier in the receiving circuit must be increased. In this case, power consumption of the entire circuit in the digital mode can be reduced as compared with that of the prior art.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 4 is a block diagram showing a third embodiment of the present invention.

DETAILED DESCRIPTION OF THE PREFERRED EMBODIMENTS

Figure 1:
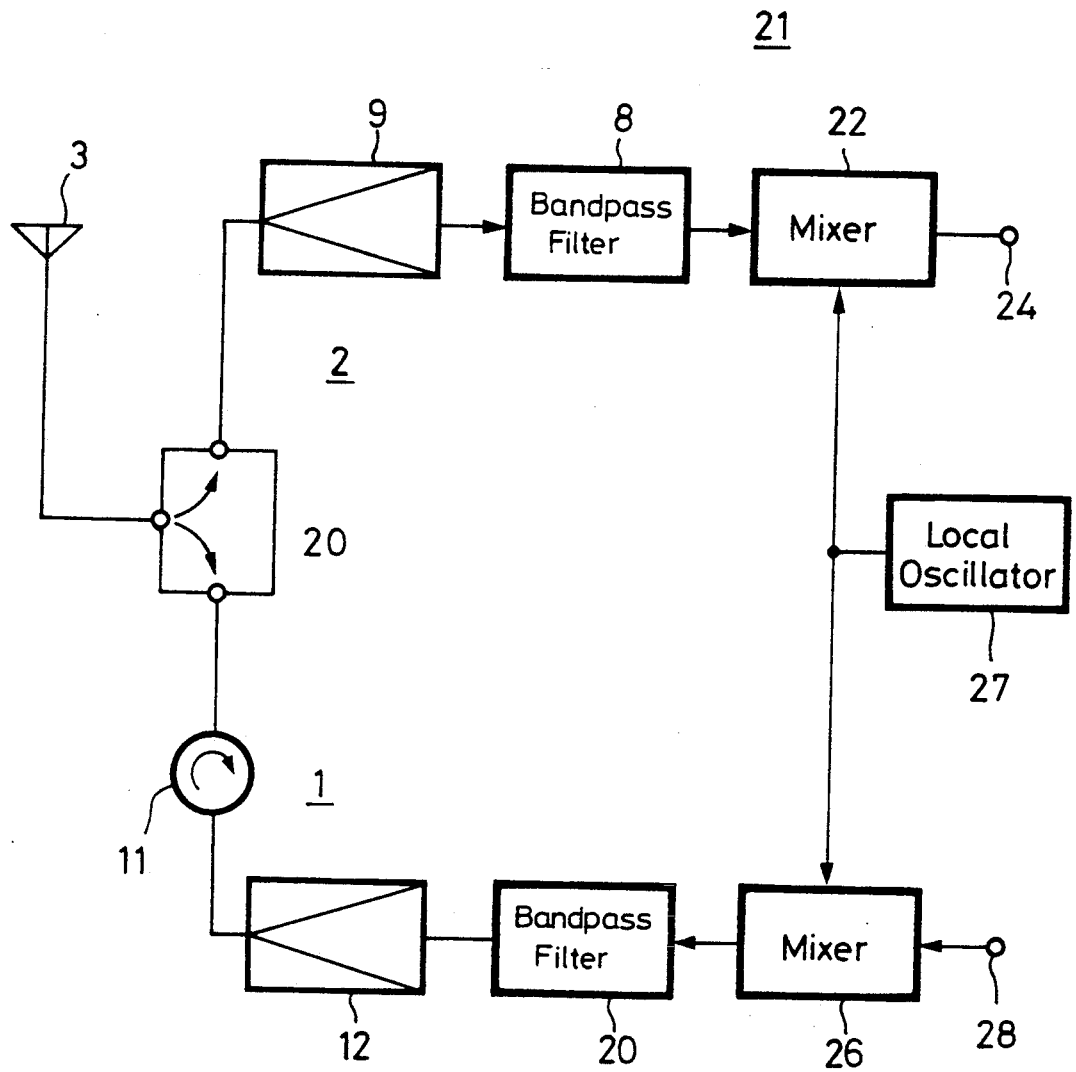
FIG. 1 is a block diagram showing an example of an antenna switching apparatus for a dual-mode transceiver according to the prior art.
Figure 2:
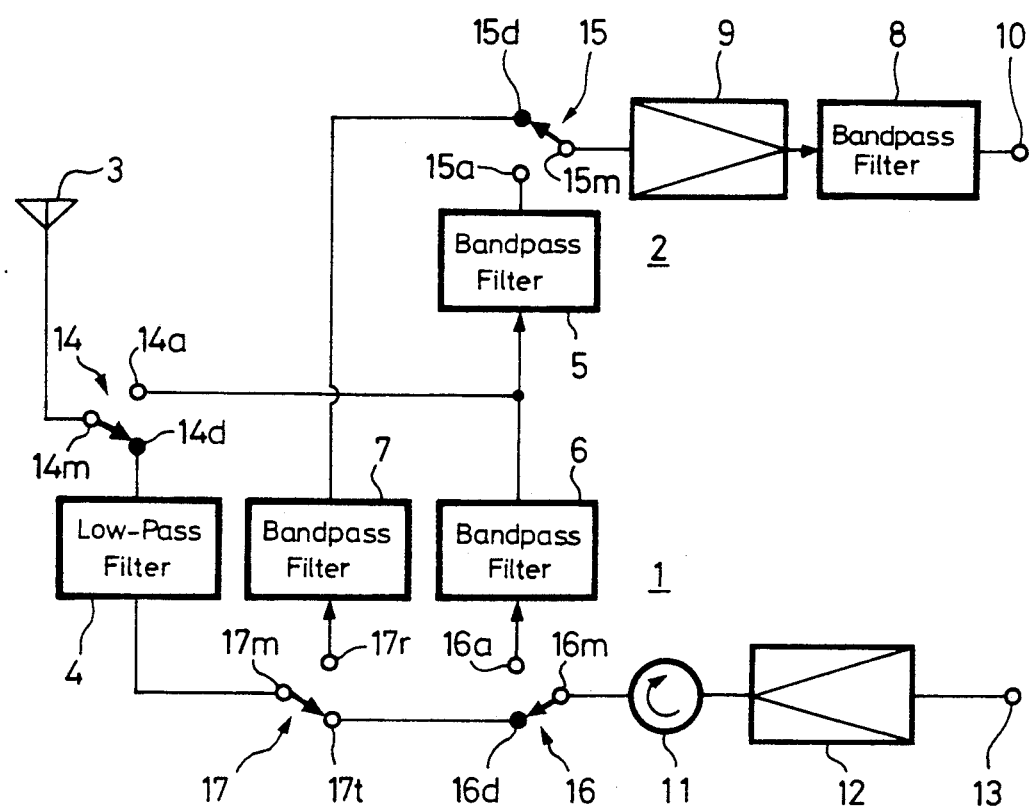
FIG. 2 is a block diagram showing a first embodiment of the antenna switching apparatus for a dual-mode transceiver according to the present invention.

Referring to FIG. 2, a first embodiment of the present invention will now be described, in which embodiment the present invention is applied to the mobile telephone in the dual-mode mobile telephone system available in the U.S.A. similar to the aforementioned example of the prior art. In FIG. 2, like parts corresponding to those of FIG. 1 are marked with the same references and therefore need not be described.

As shown in FIG. 2, analog-mode/digital-mode change-over switches 14, 15 and 16 respectively include movable contacts 14m, 15m, 16m, analog mode fixed contacts 14a, 15a, 16a and digital mode fixed contacts 14d, 15d, 16d, and these analog-mode/digital-mode change-over switches 14, 15 and 16 will hereinafter be referred to as A/D change-over switches for simplicity.

A transmission and reception change-over switch 17 includes a movable contact 17m, a transmission side fixed contact 17t and a reception side fixed contact 17r.

The transmission and reception antenna 3 is connected to the movable contact 14m of the A/D change-over switch 14, and the movable contact 15m of the A/D change-over switch 15 is connected to the high frequency amplifier 9 of the receiving circuit 2. The output terminal of the high frequency amplifier 9 is connected to the bandpass filter 8, from which the received high frequency signal is fed to an output terminal 10.

A transmission high frequency signal applied to an input terminal 13 is supplied through the high frequency amplifier 12 and the circulator 11 to the movable contact 16m of the A/D change-over switch 16.

A dielectric bandpass filter 5 has in the analog mode, a pass band of a received high frequency signal whose carrier frequency is, for example, 880 MHz, and a dielectric bandpass filter 6 has similarly in the analog mode, a pass band of a transmission high frequency signal whose carrier frequency is, for example, 835 MHz. The insertion losses of the dielectric bandpass filters 5 and 6 are as large as 2 to 3 dB, respectively.

The fixed contact 14a of the A/D change-over switch 14 is connected through the bandpass filter 5 to the fixed contact 15a of the A/D change-over switch 15, and the fixed contact 16a of the A/D change-over switch 16 is connected through the bandpass filter 6 to the fixed contact 114a of the A/D change-over switch 14.

A fixed contact 14r of the transmission reception change-over switch 17 is connected to the fixed contact 15d of the A/D change-over switch 15 through a bandpass filter 7 of low insertion loss and which has a pass band of a received high frequency signal whose carrier frequency is 880 MHz upon reception in the digital mode. The fixed contact 16d of the A/D change-over switch 16 is connected to the fixed contact 17t of the transmission reception change-over switch 17 and the movable contact 17m of the transmission reception change-over switch 17 is connected to the fixed contact 14d of the A/D change-over switch 14 via a two-way low-pass filter 4 which has a cut-off frequency of a high band of a spurious output caused by the switching of the switch 17, or which has pass bands of both transmission and received high frequency signals whose carrier frequencies are 835 MHz and 880 MHz, respectively.

In the analog mode, the movable contacts 14m, 15m, 16m of the A/D change-over switches 14, 15 and 16 are connected to their analog mode fixed contacts 14a, 15a, 16a, respectively. Then, the transmission and the reception can be carried out in the same fashion. Accordingly, in the analog mode, if the bandpass filters 5 and 6 are replaced with the duplexer 20 in the example of the prior art shown in FIG. 1, then the circuit configuration of FIG. 2 becomes the same as that of the example of the prior art shown in FIG. 1.

In the digital mode, the movable contacts 14m, 15m and 16m of the A/D change-over switches 14, 15 and 16 are connected to their digital mode fixed contacts 14d, 15d and 16d, respectively. In response to the transmission and the reception, the movable contact 17m of the transmission reception change-over switch 17 is selectively changed in position to the transmission side fixed contact 17t and the reception side fixed contact 17r.

Since the transmission high frequency signal and the received high frequency signal are neither processed by the dielectric bandpass filters 5 and 6, each having the large insertion loss and since the insertion loss of the low-pass filter 4 having the pass band of the transmission high frequency signal and the received high frequency signal and the insertion loss of the bandpass filter 7 having the pass band of the received high frequency signal are both small, the attenuation of the received high frequency signal received by the transmission and reception antenna 3 is suppressed to be small enough, thereby the amplification factor of the high frequency amplifier 9 being decreased accordingly. Therefore, since the transmission high frequency signal need not be amplified so much by the high frequency amplifier 12, it is sufficient that the amplification factor of the high frequency amplifier 12 is small. Accordingly, the power consumption in the digital mode may be reduced both in the transmission and reception processes, thereby the overall power consumption in the digital mode being considerably reduced as compared with that of the example of the prior art.

Figure 3:
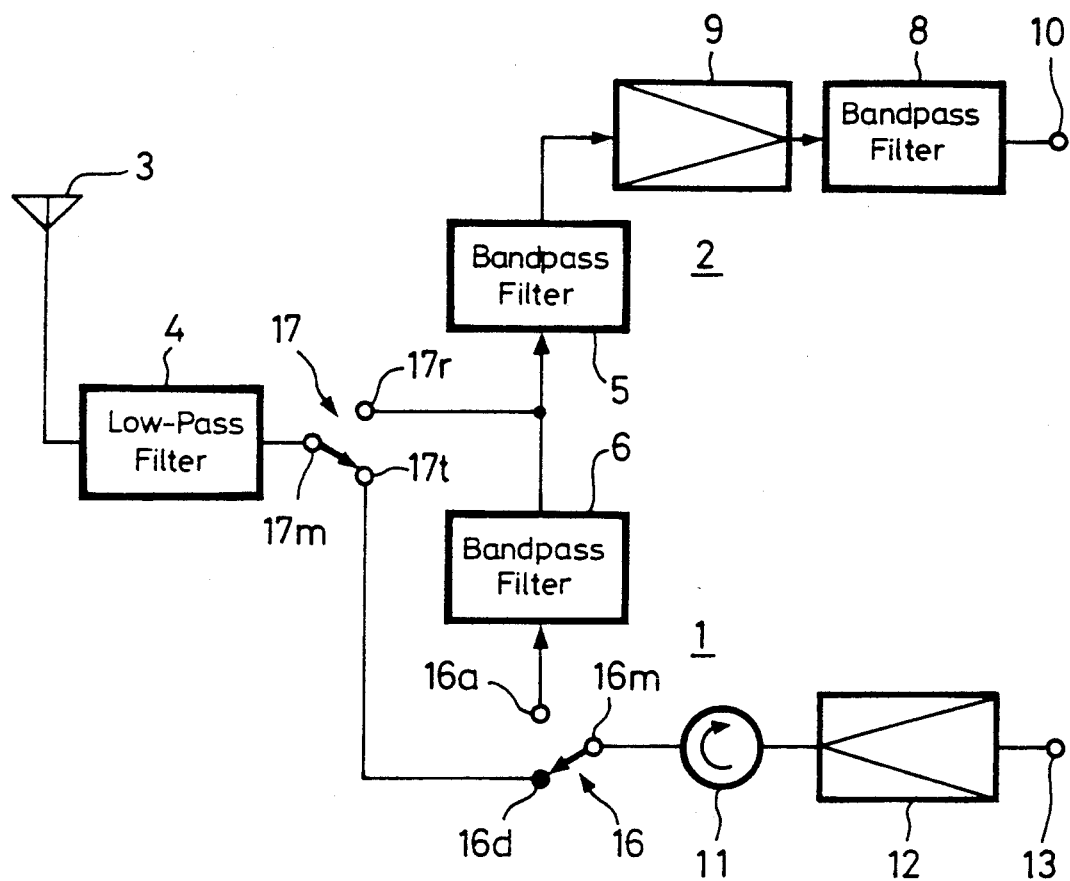
FIG. 3 is a block diagram showing a second embodiment of the present invention.

A second embodiment of the present invention will now be described with reference to FIG. 3. In this embodiment, the circuit configuration of the antenna switching apparatus of the present invention can be simplified further as compared with that of the first embodiment shown in FIG. 2. That is, in this embodiment, the A/D change-over switches 14, 15 and the bandpass filter 7 shown in the first embodiment of FIG. 2 are removed. In FIG. 3, like parts corresponding to those of FIG. 2 are marked with the same references and therefore need not be described in detail.

The transmission and reception antenna 3 is coupled through the low-pass filter 4 to the movable contact 17m of the transmission and reception change-over switch 17, and the digital mode fixed contact 16d of the A/D change-over switch 16 is directly connected to the transmission side fixed contact 17t of the transmission and reception change-over switch 17. Then, the output side of the bandpass filter 5 is directly connected to the high frequency amplifier 9 of the receiving circuit 2, and the rest of the circuit configuration of FIG. 3 is similar to that of FIG. 2.

In the second embodiment of the present invention, although the power consumed in the reception is increased because the received high frequency signal is processed by the dielectric bandpass filter 5 having large insertion loss in the digital mode, the power consumption is reduced upon transmission similarly to FIG. 2. Thus, the whole power consumption of the overall arrangement of the apparatus in the digital mode can be reduced as compared with that of the example of the prior art.

FIG. 4 shows in block form a third embodiment of the antenna switching apparatus according to the present invention, in which case the transmission and reception change-over switch 17 of FIGS. 2 and 3 is removed. In FIG. 4, like parts corresponding to those of FIG. 4 are marked with the same references.

As shown in FIG. 4, the A/D change-over switches 14, 15 and 16 have the movable contacts 14m, 15m and 16m, the analog mode fixed contacts 14a, 15a and 16a and the digital mode fixed contacts 14d, 15d and 16d, respectively.

The transmission and reception antenna 3 is connected to the movable contact 14m of the A/D change-over switch 14 via the two-way loss-pass filter 4 of low insertion loss which has pass bands of both transmission and reception high frequency signals whose carrier frequencies are respectively 835 MHz and 880 MHz.

The dielectric bandpass filter 5 has the pass band of the reception high frequency signal whose carrier frequency is, for example, 880 MHz in the analog mode, and the dielectric bandpass filter 6 has the pass band of the transmission high frequency signal whose carrier frequency is, for example, 835 MHz similarly in the analog mode. The insertion losses of the dielectric bandpass filters 5 and 6 are as large as 2 to 3 dB, respectively.

The analog mode fixed contact 14a of the A/D change-over switch 14 is directly connected to the analog mode fixed contact 15a of the A/D change-over switch 15. The movable contact 15m of the A/D change-over switch 15 is connected through the bandpass filter 5 to the high frequency amplifier 9 of the receiving circuit 2, and the output terminal of the high frequency amplifier 9 is connected to the bandpass filter 8, thereby the reception high frequency signal being fed to the output terminal 10.

A 3-terminal circulator 18 includes first, second and third terminals 18A, 18B and 18C and formed of an isolator having characteristics such that a signal is supplied from the first terminal 18A to the second terminal 18B (insertion loss is as very low as about 0.5 dB) while the supply of the signal from the second terminal 18B to the first terminal 18A is blocked and that a signal is supplied from the second terminal 18B to the third terminal 18C (insertion loss is similarly very low at about 0.5 dB) while the supply of the signal from the third terminal 18C to the second terminal 18B is blocked. A class-AB amplifier is employed as this 3-terminal circulator.

The transmission high frequency signal applied to the input terminal 13 is supplied through the high frequency amplifier 12 to the first terminal 18A of the circulator 18. The second terminal 18B of the circulator 18 is connected to the movable contact 16m of the A/D change-over switch 16, and its third terminal 18C is connected to the digital mode fixed contact 15d of the A/D change-over switch 15.

The digital mode fixed contact 16d of the A/D change-over switch 16 is directly coupled to the digital mode fixed contact 14d of the A/D change-over switch 14, and the analog mode fixed contact 16a of the A/D change-over switch 16 is connected through the bandpass filter 6 to the movable contact 15m of the A/D change-over switch 15.

In the analog mode, the movable contacts 14m, 15m, 16m of the A/D change-over switches 14, 15 and 16 are respectively changed in position to the analog mode fixed contacts 14a, 15a, 16a, and the transmission and the reception can be carried out simultaneously. Accordingly, in the analog mode, the circuit configuration of FIG. 4 becomes substantially the same as that of the second embodiment of FIG. 3.

In the digital mode, the movable contacts 14m, 15m, 16m of the A/D change-over switches 14, 15, 16 are respectively changed in position to the digital mode fixed contacts 14d, 15d, 16d. In this case, since in the digital mode the transmission high frequency signal is not processed by the bandpass filter 6 having large insertion loss but processed by the low-pass filter 4 having small insertion loss and by the circulator 18 having small insertion loss, the transmission high frequency signal need not be amplified so much by the high frequency amplifier 12, which can make the amplification factor of the high frequency amplifier 12 small. Therefore, the whole power consumption in the digital mode can be reduced as compared with the example of the prior art shown in FIG. 1, and thus, the third embodiment is substantially the same as the second embodiment of FIG. 3 with respect to the power consumption.

Further, while the A/D change-over switches 14, 15, 16 and the 3-terminal circulator 18 are employed in the above-mentioned third embodiment, the circuit configuration can be simplified more because the transmission and reception change-over switch is not employed. Furthermore, as compared with the first and second embodiments, the third embodiment has an advantage such that a transmission and reception change-over control signal supplied to the transmission and reception change-over switch need not be generated.

Having described the preferred embodiments of the invention with reference to the accompanying drawings, it is to be understood that the invention is not limited to those precise embodiments and that various changes and modifications thereof could be effected by ones skilled in the art without departing from the spirit or scope of the invention as defined in the appended claims.

What is claimed is:

1. An antenna switching apparatus for a dual-mode transceiver having a transmission and reception antenna, a transmitting circuit, a receiving circuit, and a separating filter of large insertion loss connected to said transmission and reception antenna, said transmitting circuit, and said receiving circuit for separating a transmission high frequency signal and a reception high frequency signal having different carrier frequencies, so that transmission and reception in a digital mode of an alternative transmission and reception switching system and transmission and reception in an analog mode of a simultaneous transmission and reception system is provided, comprising:

a first analog-to-digital change-over switch whose movable contact is connected to said transmission and reception antenna;

a second analog-to-digital change-over switch whose analog side fixed contact and movable contact are connected between said separating filter and said receiving circuit;

a third analog-to-digital change-over switch whose movable contact and analog side fixed contact are respectively connected to said transmitting circuit and said separating filter;

a transmission and reception change-rover switch whose transmission side fixed contact and reception side fixed contact are respectively connected to said transmitting circuit and said receiving circuit via said second and third analog-to-digital change-over switches respectively and which changes-over between transmission and reception in the digital mode;

a blocking filter of low insertion loss connected between a digital side fixed contact of said first analog-to-digital change-over switch and a movable contact of said transmission and reception change-over switch for blocking a high frequency band of a spurious signal caused by switching of said transmission and reception change-over switch; and a bandpass filter of low insertion loss connected between said reception side fixed contact of said transmission and reception change-over switch and a digital side fixed contact of said second analog-to-digital change-over switch and passing therethrough said reception high frequency signal.

2. The antenna switching apparatus according to claim 1, wherein said analog side fixed contact and said digital side fixed contact of said first analog-to-digital change-over switch are respectively connected to said separating filter and said blocking filter.

3. The antenna switching apparatus according to claim 1, wherein said blocking filter is connected between said digital side fixed contact of said first analog-to-digital change-over switch and the movable contact of said transmission and reception change-over switch.

4. The antenna switching apparatus according to claim 1, wherein said blocking filter is a low-pass filter which passes therethrough said transmission high frequency signal and said reception high frequency signal in said digital mode.

5. The antenna switching apparatus according to claim 1, wherein said bandpass filter is connected between said reception side fixed contact of said transmission and reception change-over switch and said digital side fixed contact of said second analog-to-digital change-over switch.

6. An antenna switching apparatus for a dual-mode transceiver having a transmission and reception antenna, a transmitting circuit, a receiving circuit and a separating filter of large insertion loss provided between said transmission and reception antenna, said transmitting circuit, and said receiving circuit for separating a transmission high frequency signal and a reception high frequency signal having different carrier frequencies, so that transmission and reception in a digital mode of an alternative transmission and reception switching system and transmission and reception in an analog mode of a simultaneous transmission and reception system is provided, comprising:

a first analog-to-digital change-over switch whose movable contact is connected to said transmission and reception antenna via a bandpass filter of low insertion loss for passing therethrough said transmission high frequency signal and said reception high frequency signal;

a second analog-to-digital change-over switch whose movable contact is connected to said separating filter and whose analog mode fixed contact is connected to an analog mode fixed contact of said analog-to-digital change-over switch;

a 3-terminal isolator of low insertion loss having first, second, and third terminals in which said first terminal is connected with said transmitting circuit and said third terminal is connected to a digital mode fixed contact of said second analog-to-digital change-over switch; and a third analog-to-digital change-over switch whose movable contact is connected to said second terminal of said 3-terminal isolator, whose analog mode fixed contact is connected to said separating filter and whose digital mode fixed contact is connected to a digital mode fixed contact of said first analog-to-digital change-over switch.

7. The antenna switching apparatus according to claim 6, wherein said 3-terminal isolator supplies a signal from said first terminal to said second terminal and inhibits supply of a signal from said second terminal to said first terminal, and said 3-terminal isolator supplies a signal from said second terminal to said third terminal and inhibits supply of a signal from said third terminal to said second terminal.

8. An antenna switching apparatus for a dual-mode transceiver having a transmission and reception antenna, a transmitting circuit, a receiving circuit and a separating filter of large insertion loss provided between said transmission and reception antenna, said transmitting circuit, and said receiving circuit for separating a transmission high frequency signal and a reception high frequency signal having different carrier frequencies, so that transmission and reception in a digital mode of an alternative transmission and reception switching system and transmission and reception in an analog mode of a simultaneous transmission and reception system is provided, comprising:

an analog-to-digital change-over switch whose movable contact and analog side fixed contact are connected between said transmitting circuit and said separating filter;

a transmission and reception change-over switch whose transmission side fixed contact is connected to a digital side fixed contact of said analog-to-digital change-over switch and whose reception side fixed contact is connected to said separating filter; and a blocking filter of low insertion loss connected between said transmission and reception antenna and a movable contact of said transmission and reception change-over switch for blocking a high frequency band of a spurious signal caused by switching of said transmission and reception change-over switch.

9. The antenna switching apparatus according to claim 6 or 8, wherein said separating filter is composed of a first bandpass filter which passes therethrough said reception high frequency signal in said analog mode and in said digital mode and a second bandpass filter which passes therethrough said transmission high frequency signal in said analog mode.

10. The antenna switching apparatus according to claim 8, wherein said blocking filter is a low-pass filter of two-way type for passing therethrough both of said transmission and reception high frequency signals in said analog mode and in said digital mode.

* * * * *

UNITED STATES PATENT AND TRADEMARK OFFICE
CERTIFICATE OF CORRECTION

PATENT NO. : 5,276,914
DATED : January 4, 1994
INVENTOR(S) : Seijiro Ishizuka; Kazuto Kitakubo It is certified that error appears in the above-indentified patent and that said Letters Patent is hereby corrected as shown below:

In the Abstract, line 4, delete "," third occurrence
Col. 5, line 39, after "has" insert --,--
      line 42, after "has" insert --,--

In the Claims:
Col. 9, line 5, change "change-rover" to --change-over--

Signed and Sealed this

Tenth Day of January, 1995

Attest:

BRUCE LEHMAN

Attesting Officer     Commissioner of Patents and Trademarks